(12) United States Patent
O'Connell et al.

(10) Patent No.: US 11,016,745 B2
(45) Date of Patent: May 25, 2021

(54) SYSTEMS AND METHODS FOR GENERATING DISTRIBUTED SOFTWARE PACKAGES USING NON-DISTRIBUTED SOURCE CODE

(71) Applicant: Visa International Service Association, San Francisco, CA (US)

(72) Inventors: Craig O'Connell, San Mateo, CA (US); Theodore Harris, San Francisco, CA (US); Yue Li, San Mateo, CA (US); Tatiana Korolevskaya, Mountain View, CA (US)

(73) Assignee: VISA INTERNATIONAL SERVICE ASSOCIATION, San Francisco, CA (US)

( * ) Notice: Subject to any disclaimer, the term of this patent is extended or adjusted under 35 U.S.C. 154(b) by 0 days.

(21) Appl. No.: 16/636,542

(22) PCT Filed: Aug. 11, 2017

(86) PCT No.: PCT/US2017/046610
§ 371 (c)(1),
(2) Date: Feb. 4, 2020

(87) PCT Pub. No.: WO2019/032123
PCT Pub. Date: Feb. 14, 2019

(65) Prior Publication Data
US 2020/0387364 A1 Dec. 10, 2020

(51) Int. Cl.
*G06F 8/51* (2018.01)
(52) U.S. Cl.
CPC ..................... *G06F 8/51* (2013.01)
(58) Field of Classification Search
CPC ....................................................... G06F 8/51
See application file for complete search history.

(56) References Cited

U.S. PATENT DOCUMENTS 5,675,805 A * 10/1997 Boldo ...................... G06F 8/30
717/114
9,766,996 B1 * 9/2017 Cao ..................... G06F 11/3447
(Continued)

FOREIGN PATENT DOCUMENTS

KR   1020140056743   5/2014

OTHER PUBLICATIONS

PCT/US2017/046610, "International Search Report and Written Opinion", dated May 2, 2018, 9 pages.

*Primary Examiner* — Wei Y Zhen
*Assistant Examiner* — Binh Luu
(74) *Attorney, Agent, or Firm* — Kilpatrick Townsend & Stockton LLP

(57) ABSTRACT

Systems and methods are provided for transcompiling non-distributed source code for a nondistributed software program into a distributed software package for implementation on a distributed computing system. A transcompiler can identify loops within non-distributed source code written in a data-driven language. The transcompiler can generate MapReduce jobs using mapper keys based on grouping indicators associated with each of the loops. The MapReduce jobs can be linked together based on input-output connections of the loops in the non-distributed source code. Then, the transcompiler can generate a distributed software package including the generated MapReduce jobs to implement the same functionality as the non-distributed source code on the distributed computing system, thereby improving the speed of execution over very large datasets. The distributed software package can be optimized using machine learning searching algorithms. The distributed software package can also be optimized based on execution usage statistics.

14 Claims, 7 Drawing Sheets

(56) References Cited

U.S. PATENT DOCUMENTS

| | | |
|---|---|---|
| 2010/0281078 A1* | 11/2010 | Wang ................ G06F 16/24532 |
| | | 707/812 |
| 2012/0226639 A1* | 9/2012 | Burdick ................ G06F 9/4843 |
| | | 706/12 |
| 2013/0036149 A1 | 2/2013 | Kosuru et al. |
| 2014/0123115 A1 | 5/2014 | Peretz |
| 2015/0356157 A1 | 12/2015 | Anderson et al. |
| 2016/0110176 A1* | 4/2016 | Fink ........................ G06F 8/443 |
| | | 717/137 |
| 2017/0017569 A1 | 1/2017 | Li et al. |
| 2017/0024245 A1* | 1/2017 | Goh ...................... G06F 9/5027 |
| 2020/0104378 A1* | 4/2020 | Wagner ............. G06F 16/24552 |

* cited by examiner

```
1    wordFreq = load("./wordFreq.csv",
     "./wordFreq.meta");
2    statistics_1 = return("./statistics_1");
3    output temp1;
4        input wordFreq;
5            freqcount;
6            word1 = word.substr(0,1);
7            word2 = word.substr(0,2);
8            word3 = word.substr(0,3);
9            tmp.ilen = word.len();
10           if tmp.ilen > 3;
11   run;
12   with summarize(data = temp1, out = temp_agg);
13       category(word1);
14       var(freqcount);
15   end with;
16   with summarize(data = temp1, out = temp_agg);
17       category(word2);
18       var(freqcount);
19   end with;
20   with summarize(data = temp1, out = temp_agg);
21       category(word3);
22       var(freqcount);
23   end with;
24   output statistics_1;
25       input temp_agg;
26           t.tkeys = keys.expand(':','string',2);
27           t._max = temp_agg.max;
28           t._cnt = temp_agg.cnt;
29           t._total = temp_agg.total;
30           t._avg = t._total/t._cnt;
31           t._avg = t._avg *1000;
32           t._avg = t._avg.round();
33           tkeys = t.tkeys;
34           tavg = t._avg ;
35   run;
```

FIG. 2

```
1    wordFreq = load("./wordFreq.csv","delim",
     "./wordFreq.meta","csv");
2    statistics_1 = return("./user/statistics_1",
     "delim","csv");
3    output temp1;
4         input wordFreq;
5              freqcount;
6              word1 = word.substr(0,1);
7              word2 = word.substr(0,2);
8              word3 = word.substr(0,3);
9              tmp.ilen = word.len();
10             if tmp.ilen > 3;
11   run;

12   with summarize(data = temp1, out = temp_agg);
13        category(word1);
14        var(freqcount);
15   end with;

16   with summarize(data = temp1, out = temp_agg);
17        category(word2);
18        var(freqcount);
19   end with;

20   with summarize(data = temp1, out = temp_agg);
21        category(word3);
22        var(freqcount);
23   end with;

24   output statistics_1;
25        input temp_agg;
26             t.tkeys = keys.expand(':','string',2);
27             t._max = temp_agg.max;
28             t._cnt = temp_agg.cnt;
29             t._total = temp_agg.total;
30             t._avg = t._total/t._cnt;
31             t._avg = t._avg *1000;
32             t._avg = t._avg.round();
33             tkeys = t.tkeys;
34             tavg = t._avg ;
35   run;
```

FIG. 3

| | 1st Scan | 2nd Scan | 3rd Scan |
|---|---|---|---|
| Exclude Dates | No Key | Account | Account |
| Score by Account | | Account | Account |
| Summarize Distribution of Scores | | | Score |

FIG. 5

SYSTEMS AND METHODS FOR GENERATING DISTRIBUTED SOFTWARE PACKAGES USING NON-DISTRIBUTED SOURCE CODE

BACKGROUND

Computer software packages are traditionally executed by a single computer having one or more processors and memory shared between the processors. For large datasets, a software package can be programmed to distribute tasks across multiple computers operating on a portion of the dataset. However, software packages specifically programmed for a certain implementation architecture may not be scalable. Furthermore, the code used to distribute tasks in one software package may not be easily adapted for use in other software packages.

Distributed computing frameworks have been developed to overcome these difficulties. Generally, distributed computer frameworks use of a cluster of computer systems to implement a software program by dividing the program into a plurality of tasks, some of winch can be performed in parallel by a subset of the computer systems within the cluster. A distributed software framework can establish rules for distributing data and tasks to different computer systems in order to provide scalability and redundancy. In a distributed software framework, data and computing resources can be dynamically distributed among the networked computer systems in order to quickly and efficiently process a software program that operates on a large data set. As such, distributed software frameworks provide scalability since different software programs can be implemented on them and since the framework can operate on computer system clusters of different sizes as needed.

MapReduce is a programming model for implementing software programs on a distributed computing framework. At a high level, the MapReduce algorithm includes two parts, mapping and reducing. A mapper process operating on a computer system can receive a set of input data and convert each element of the input data into a key/value pair. A plurality of mappers can operate on each element of input data independently, enabling the mapping process to be distributed among a plurality of computers that each operate on a subset of the input data. A reducer process operating on a computer system can take the key/value pairs output from the mapper as input and combine the key/value pairs into a smaller set of key-value pairs. As such, MapReduce is advantageous because it enables a large number of computing systems to operate on a very large set of data in parallel.

Currently, many software programs in operation and development are not designed to be implemented on a distributed computing framework, and thus, cannot be easily scaled to operate on a very large dataset. While some software programs could be rewritten to use MapReduce, thereby enabling them to be implemented on a distributed computing framework, doing so is nontrivial and requires software developers with distributing computer technical expertise since selecting improper mapper keys could result in incorrect operation.

Embodiments of the present invention address these and other problems individually and collectively.

BRIEF SUMMARY

Some embodiments of the invention relate to systems and methods for compiling a distributed software package using source code written in a data-driven programming language for implementation on a non-distributed computer system. The systems and methods can use a transcompiler to identify loops within the non-distributed software program using the non-distributed source code. The transcompiler can identify the loops of the non-distributed source code by determining the functions performed within the non-distributed source code, since the non-distributed is data-driven.

The systems and methods can use the transcompiler to determine grouping indicators associated with each of the loops. The grouping indicators may be included in one or more configuration files associated with the non-distributed source code or one or more configuration files associated with the particular function of the loop itself. The configuration file may associate the function of the loop with a particular grouping indicator, thereby indicating the particular piece of data or type of data that the operation performed by the first loop is grouped by.

The systems and methods can use the transcompiler to generate MapReduce jobs for each of the loops of the non-distributed source code. The MapReduce jobs may implement the same functionality as the loops of the using the non-distributed source code using mapper keys determined based on the grouping indicators. The transcompiler can generate a distributed software package including the MapReduce jobs. The systems and methods may also optimize the distributed software package using machine learning searching algorithms or through analysis of execution usage statistics.

As such, the systems and methods can use the transcompiler to automatically generate a distributed software package for implementation on a distributed software framework that provides the same, or similar, functionality as non-distributed software based on the non-distributed source code. Therefore, non-distributed software programs written in data-driven programming languages can quickly, easily, accurately, and automatically be ported to distributed software frameworks, thereby providing reducing time and costs compared to software porting performed by human software developers. By porting these software programs to be implemented on a distributed computing system, their speed and efficiency in processing very large data sets is improved compared to the same software functionality implemented on a non-distributed system. In addition, any inefficiencies cause by the different programming methods used by the automatic transcompiler, compared to software developers, may be offset through optimization based on usage statistics and the use of machine learning searching algorithms.

A better understanding of the nature and advantages of embodiments of the present invention may be gained with reference to the following detailed description and the accompanying drawings.

BRIEF DESCRIPTION OF THE DRAWINGS

FIG. 2 shows an excerpt of source code for a word frequency software program written in a data-driven programming language for implementation on a non-distributed computer system, in accordance with some embodiments.

FIG. 3 shows the excerpt of source code of FIG. 2 having code elements flagged based on an analysis of the source code using a distributed compiler, in accordance with some embodiments.

FIG. 5 shows a table of mapper keys determined by a distributed software compiler for a set MapReduce jobs, in accordance with some embodiments.

Figure 1:
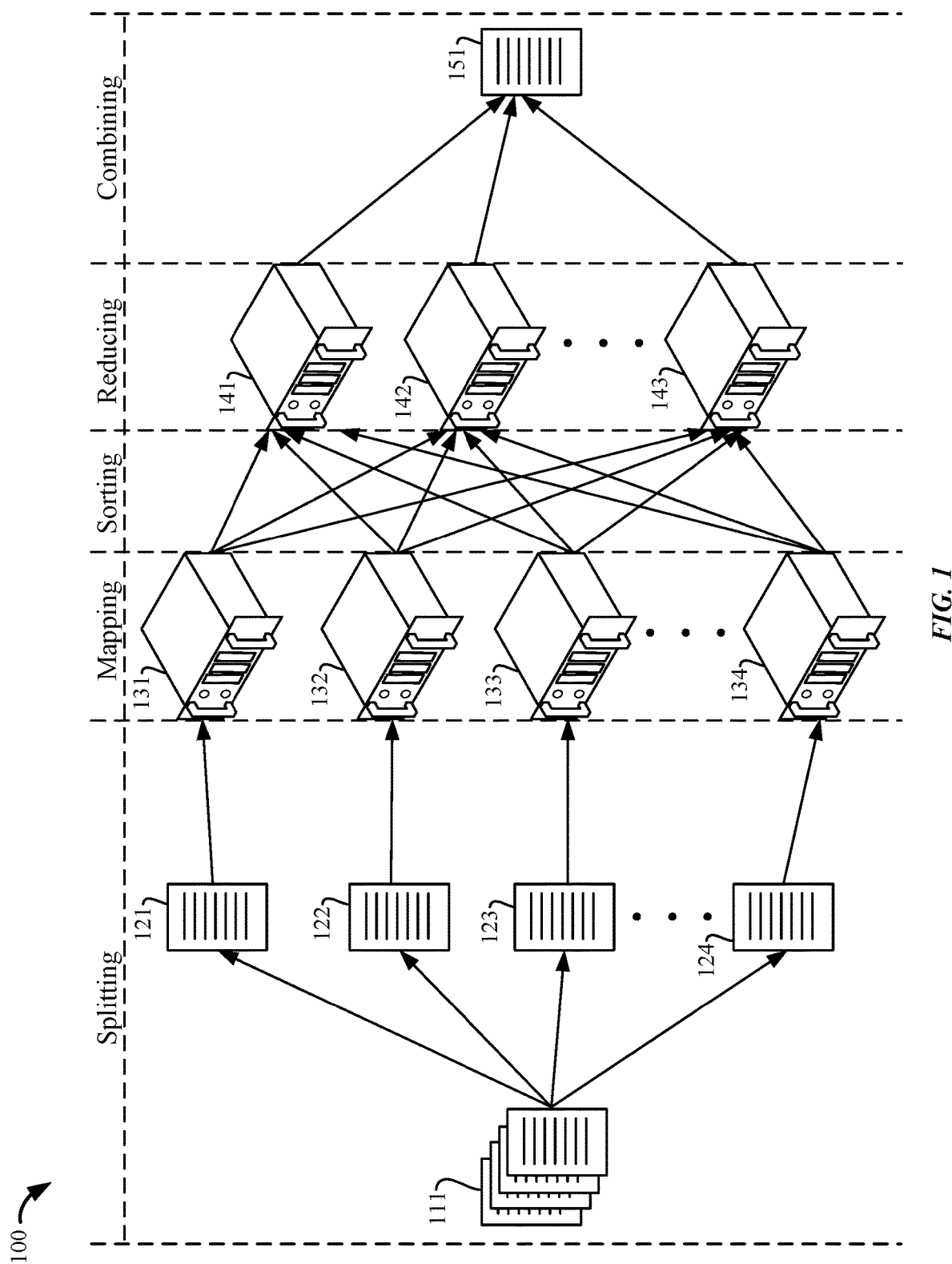
FIG. 1 shows a simplified data flow diagram of MapReduce implemented in a distributed computing system.

In the drawings, dotted or dashed lines may be used to indicate organizational structure, to indicate that an element is optional, or to indicate that data or information is passed through an element substantially unchanged. Arrows may be used to indicate the flow of data or information between two or more elements. Excerpts of source code may have lines numbers positioned to the left of the code for reference. Ellipsis (" . . . ") shown in the drawings (in both horizontal and vertical orientation) may indicate omitted features or elements and may be used to simplify the drawing for readability.

TERMS

The following list of terms provides further description of features and concepts in the embodiments described below.

The term"distributed software framework" generally refers to a system and methodology for organizing files across a cluster of computers and organizing the implementation of distributed software using the cluster of computers. One example of a distributed software famework is Apache Hadoop, which implements a distributed file system (e.g., Hadoop Distributed File System) and can process data files using the MapReduce programming model. Distribute software frameworks can implement a platform that is responsible for managing and balancing the computing resources using by the computers in the cluster.

"MapReduce" is a type of "split-apply-combine" algorithm. "Split-apply-combine" algorithm generally include steps for "splitting" (e.g., partitioning) a set of input data into smaller pieces of data, "applying" a certain function, transformation, or algorithm to each smaller piece of data, and then "combining" the smaller pieces of data together to form a result. For example, the MapReduce algorithm can be used on a set of input data that is split among a plurality of computer systems in a distributed system. The MapReduce algorithm can use a mapping algorithm to determine key-value pain from the input data using a mapper key. Then, the key-value pairs can be sorted and combined to determine an output result.

"Data-driven programming languages" are programming languages that generally receive input data, process the input data through one or more loops, where the outputs of loops can be inputs to other loops (e.g., in a daisy chain), and then output a result that is based on the input data. The "loops" within the program can each receive a set of input data, perform a function on each items within the step of input data (e.g., loop through the input data), and then output a result that is based on the set of input data. The loops can implement both aggregative type functions or non-aggregative type functions. While certain programming languages may not be exclusively data-driven, software written using such programming languages can be "data-driven" itself when the code is limited to use only "data-drive" functions. For example, software written in "object oriented" software languages (or other types of programming languages) may operate as a "data-driven" programming language by restricting the functions used to those that receive an input file as input data, process the input data, and then output data based on the input data.

"Aggregation" type functions generally include aggregative algorithms that perform operations by across different categories, such as a "group-by" function, a "sum by account number" function, or a "data partition" by category function. Non-aggregation type functions (e.g., "instance" functions) generally include non-aggregative functions, such as mathematical transformations, which performs an operation without any grouping. The aggregation type may for each function may be indicated in a configuration file for that function by an aggregation-type flag and the category of the aggregation may be indicated by a grouping indicator. The configuration file settings may be pre-determined for a particular programming language (e.g., they are provided in a standard library), or they may be set during development of the non-distributed software. A grouping indicator can be included in a configuration file associated with the function in order to identify the data field or data type upon which the function is aggregating or grouping.

A "code generator object" can be a data object generated by an analysis of the source code to determine the data object and functions performed by the software. This analysis can determine which functions are being called at what point in the software, what functions are dependent on which other functions for operation to occur as intended, what data is being used and where it is being obtained from, and any other details that may be needed in order to execute the software on a computer system. Certain compilers may create a code generator object during the compilation process.

A "transcompiler" generally refers to a compiler that receives source code in a first programming language and generates source code, or an executable file, compatible with a second, different programming language. The non-distributed to distributed compiler described below may be referred to as a "transcompiler" because it can take source code for non-distributed systems, generate mapper code and reducer code for MapReduce jobs, and then generate a distributed software package using those MapReduce jobs for implementation on a distributed software framework. In the description herein, the term "compiler" may be used to refer to a "transcompiler."

The terms "computer system" or "computing system" may include one or more computing devices, such as a large computer mainframe, a desktop computer, a graphics processing unit (GPU) type computer, a minicomputer cluster, or a group of computers functioning as a unit (e.g., in a distributed computing system). The computer may be coupled to a database and may include any hardware, software, other logic, or combination of the preceding for servicing the requests from one or more client computers. The computer may comprise one or more computational apparatuses and may use any of a variety of computing structures, arrangements, and compilations for servicing the requests from one or more client computers.

DETAILED DESCRIPTION

The embodiments described herein relate to trans-compiling non-distributed source code for implementation on a non-distributed computer system to generate a distributed software package for implementation on a distributed computing framework based on MapReduce (e.g., Apache Hadoop). Compiling non-distributed source code into a distributed software package can be advantageous because it can enable the software package to process very large data sets that may not be efficiently processed by a single computer alone (e.g., a single computer may lack a sufficient amount of memory to process the data set).

Furthermore, distributed computing systems can include a cluster of computing systems in order to process very large data sets quicker using "split-apply-combine" algorithms, such as the MapReduce algorithm, and to provide data redundancy by storing a subset of the very large data set on each computer within the cluster. While the description below describes embodiments that use MapReduce, these embodiments can be implemented using another suitable "split-apply-combine" algorithm.

Typically, development of distributed software packages requires software developers having expertise in MapReduce algorithms to select the mapper keys and assign software functions to a plurality of mapper and reducer jobs. However, this process can be tedious and time consuming for large software projects. Furthermore, when porting existing software packages to a MapReduce framework, it is possible to introduce bugs into the software by using an incorrect mapper key. In addition, porting existing software packages is often prohibitively costly such that porting projects are never realized successfully.

As described in further detail below, the embodiments herein enable non-distributed software packages written in data-driven programming languages to be automatically ported to a distributed software framework by analyzing the source code to select mapper keys and assign software functions to MapReduce jobs.

I. Overview of Map Reduce

MapReduce is a programming algorithm that enables software tasks to be split among a cluster of computers. At a high level, the MapReduce algorithm includes mapping input data set into a collection of key-value pairs at a mapper computer, sorting the resulting key-value pairs by key and providing pairs of the same key to a reducer computer, and then reducing the key-value pairs having the same key into fewer key-value pairs (often a single key-value pair) at the reducer computer. MapReduce can be implemented by a distributed software framework to efficiently process very large data sets. As such, MapReduce is advantageous because it enables a large number of computing systems to perform certain software tasks in parallel across a very large set of data.

FIG. 1 shows a simplified data flow diagram 100 of MapReduce implemented in a distributed computing system including a cluster of computers. As indicated by the dashed lines in FIG. 1, the MapReduce algorithm includes different phases. The MapReduce framework itself (e.g., the splitting and sorting, etc.) can be structured and managed by one or more of the computers in the cluster. An example of MapReduce phases include: splitting, mapping, sorting, reducing, and combining. These phrases are further described below.

In the input phase, a set of input data 111 is obtained. The set of input data 111 is typically a very large dataset that a single computer may not be able to efficiently process (e.g., because a single computer may not have sufficient memory to process such a large dataset). The input data 111 may contain a list or array of information in any suitable format.

In the splitting phase, the input data 111 is split into a plurality of subsets, or blocks, of data. A distributed file system (e.g., Hadoop distributed file system) may allocate the data according to one or more file system rules. For example, one rule may set a maximum file size for blocks of data. Another rule may distribute the same block to multiple computers within the cluster in order to provide redundancy.

As shown in FIG. 1, the input data 111 may be split into four or more subsets, including a first subset 121, a second subset 122, a third subset 123, and a fourth subset 124. The input data 111 can be split into any number of subsets, as indicated by the ellipsis, depending on the rules of the distributed file system. Each of the subsets can be represented by a key-value pair. For example, the first subset 121 can be represented by a key-value pair having a key "K" and a value that is a list or array or information that is a subset of the input data 111. The other subsets can be represented by different keys-value pairs having different keys and different values that are different subsets of the input data 111.

For example, a MapReduce job may count the number of each alphabetic letter within the input file 111. In this example, the input file 111 may comprise a string of letters, such as "A B C B B A C B B A A A." During the splitting phase, the MapReduce algorithm may split the string of letters into four subsets. For instance, a first subset 121 can be the string "A B C," the second subset 122 an be the string "B B A." The third subset 123 can be the string "C B B." And, the fourth subset 124 can be the string "A A A." Accordingly, the first subset 121 may be represented by the following key-value pair (using < "key". "value" > notation): <"subset1", "A B C">. Likewise, the second subset 122 can be represented as <"subset2", "B B A">, the third subset 123 can be represented as <"subset3", "C B B">, and the fourth subset 124 can be represented as <"subset4", "A A A">.

After splitting, each of the subsets may be provided to a different computer within the cluster for storing and processing. For instance, the first subset 121 can be sent to a first mapper computer 131, the second subset 122 can be sent to a second mapper computer 132, the third subset 123 can be sent to a third mapper computer 133, and the fourth subset 124 can be sent to a fourth mapper computer 134.

During the mapping phase, the mapping computers can implement a mapping algorithm to map a stored subset of the input data 111 into a plurality of key-value pairs. In the letter counting example discussed above, the first mapper computer 131 can map its stored subset of the input data 111 (e.g., the first subset 121, string "A B C") to a plurality of key value pairs. For instance, the first mapper computer 131 can implement a mapping algorithm that breaks the input value string (e.g., "A B C") into a list of individual letters (e.g., ("A", "B", "C"), the "mapper keys" of the mapper's key-value pairs, and then counts each individual occurrence of that letter. In this example, the mapper algorithm executed by the first mapper computer 131 can determine three mapper keys and three corresponding values, the key-value pairs being <A,1>, <B,1>, and <C,1>. Similarly, the mapper algorithm executed by the second mapper computer 132 can determine three key-value pairs including <B,1>, <B,1>, and <A,1>. The third mapper computer 133 can determine three key-value pairs including <C,1>, <B,1>, and <B,1>. The fourth mapper computer 134 can determine three key-value pairs including <A,1>, <A,1>, <A,1>. In the letter counting example, the values of the key-value pairs all have the value of "1" since the mapper keys are individual letters (e.g., "A," "B," or "C") and the mapper algorithm is programmed to count each letter individually. The summing of the individual counts for each letter is performed in the reducer algorithm in the reducer phase, which is described below after the sorting phrase.

In the sorting phase, each of the mapper computers can send key-value pairs having the same key to the same reducer computer. The sorting phase can be managed by one or more of the computers in the distributed computing system. For instance, key-value pairs having the "A" mapper key can be sent from each of the mapper computers to a first reducer computer 141. Key-value pairs having the "B" mapper key can be sent to a second reducer computer 142. And, key-value pairs having the "C" mapper key can be sent to a third reducer computer 143. In addition, key-value pairs having the same mapper key can be merged into a single key value pair during the sorting phase.

In the letter counting example, the first mapper computer 131 can send one key-value pair having mapper key "A" to the first reducer computer 141 and the fourth mapper computer 124 can send three key-value pairs having mapper key "A" to the first reducer computer 141.

The distributed computer system or the reducer computers can merge the key-value pairs from the mapper computers into a single key-value pair. For example, the first reducer computer can obtain a key-value pair having letter "A" as the key and having a list of counting values (e.g., (1,1,1,1)) as the value. Accordingly, the sorted and merged key-value obtained by the first reducer computer 141 can be <A,(1,1,1,1)>. In some embodiments, the first reducer computer 141 may receive four <A, 1> key-value pairs instead. The second reducer computer 132 can obtain a key-value pair of <B,(1,1,1)>. And, the third reducer computer 133 can obtain a key-value pair of <C,(1,1)>.

During the reducing phase, the reducer computers can implement a reducing algorithm to reduce the received list of values (e.g., the value of the key-value pair) into a single numerical value. In the letter counting example discussed above, the first reducer computer 141 can implement a reducing algorithm to sum each counting value in the list of counting values (e.g., the list (1,1,1,1)) for mapper key "A." In this example, the output of the first reducer computer 141 is the key-value pair <A,4>. The output of the second reducer computer 142 is <B,4>. The output of the third reducer computer 143 is <C,2>. As such, the first reducer computer 141 only counts instances of the letter "A." the second reducer computer 142 only counts instances of the letter "B," and the third reducer computer only counts instances of the letter "C."

After the reducing phase, the outputs of the reducing computers are sent to a single computer of the distributed file system and combined into a single output file 151 containing the counts for each letter. By using MapReduce, the counting of letters A, B, and C has been split up by letter (the mapper key) in order to spread the task across the numerous mapping and reducing computers. As shown in this example, the mapper keys must be selected properly in order for MapReduce to efficiently split the task among the computers in the cluster. Since the task to be performed is counting letters, the mapper keys were properly selected to be the different letters themselves (e.g., A, B, and C). Given these mapper keys, each reducer computer can receive the complete set of data needed to accurately count the instances of each letter (e.g., a single reducer computer can receive all of the data corresponding to a particular mapper key). For instance, the first reducer computer 141 can receive all of the counts of letter "A" and none of the other reducer computers received any of the counts of letter A. Otherwise, if none of the mapper keys were selected to be "A," then none of the reducer computers would be able to accurately count all of the instances of the letter "A" since they would each lack the complete set of counts. While the selection of mapper keys may be clear in this simplified letter counting example, the proper selection of mapper keys may become more difficult as the complexity of a particular function increases.

II. Compiling Non-Distributed Source Code into a Distributed Software Package

As discussed above, it can be efficient to process a very large data set on a distributed file system using MapReduce compared to processing the same data set on a non-distributed computer system. However, many existing software programs that process very large data sets are written in non-distributed programming languages. Some of these software programs could be rewritten to use MapReduce. While mechanisms for porting existing software programs to distributed computing systems exist, they require software developers to have sufficient expertise in MapReduce in order to properly select mapper keys and arrange MapReduce jobs to ensure correct execution.

The description corresponding to FIGS. 2-4, below, describe a transcompiler that can automatically compile source code for a non-distributed software program into a distributed software package. The transcompiler provides efficient and accurate porting of existing software programs written in non-distributed, data-driven programming languages to distributing computing systems.

FIG. 2 shows an excerpt of source code 200 for a word frequency software program written in a data-driven programming language for implementation on a non-distributed computer system, in accordance with some embodiments. In general, data-driven programming languages are those that receive input data, loop over the input data, performing mathematical transformations or other operations on elements of the input data, and then output the resulting output data. The compiler according to the embodiments described herein can automatically compile the non-distributed source code into a distributed software package based on an analysis of the data loops in a data-driven programming language. The compilation of the source code 200 into a distributed software package is further described below.

Some programming languages (e.g., certain scripting languages) can be strictly, or mostly data-driven, requiring each function to receive input data, loop over the input data, and then output data. The output data of one data loop can be input into another data loop, and the output of that data loop can be output into another data loop, as a daisy chain of loops. Other programming languages can be restricted to a subset of their available functionality in order to strictly provide data-drive functionality. Python. LISP, Ada 95, SQL, and Pascal are examples of programming languages that are data-driven or that could be restricted so as to be data-driven.

For simplicity and readability, the source code 200 shown in FIG. 2 is only an excerpt of source code for a non-distributed software program that counts the frequency of words in a much larger software program. As such, certain functions are called within the source code 200 but the operations performed within those functions are not shown. For readability. FIG. 2 shows line numbers on the left-side of the source code 200 for each line of code.

At a high level, line 1 of the source code 200 receives an input file containing comma separated values (wordFreq.csv) and a metadata file (wordFreq.meta). The metadata file can contain information about how columns are stored in the corresponding input file and information on the data types of the information stored therein. Line 2 of the source code 200 sets "statistics_1" as the output file.

Lines 3-11 of the source code 200 receive wordFreq (delimited from word.Freq.csv) as the input file, identify substrings from the input file (identified as "word1," "word2," and "word3"), and output "temp1."

Lines 12-15 of the source code 200 loop over the elements of input data "temp1," count the instances of "word1" in input data "temp1," and output the counts to "temp_agg."

Lines 16-19 of the source code 200 loop over the elements of input data "temp1," count the instances of "word2" in input data "temp 1," and output the counts to "temp_agg."

Lines 20-23 of the source code 200 loop over the elements of input data "temp1," count the instances of "word3" in input data "temp 1," and output the counts to "temp_agg."

Lines 24-35 of the source code 200 receive "temp_agg" as input, determined word frequency statistics from "temp_agg," and output the statistics (e.g., maximum, average, total, etc.) to "statistics_1."

A non-distributed to distributed compiler, as described herein, can analyze the source code 200 to create MapReduce jobs using the appropriate mapper keys as further described below with reference to FIGS. 3 and 4.

FIG. 3 shows an excerpt of the source code 300 of FIG. 2 having code elements tagged based on an analysis of the source code 300 using a non-distributed to distributed transcompiler, according to embodiments of the invention. For readability, FIG. 3 shows the analysis as being performed on the source code itself. However, the analysis described below with respect to FIG. 3 may also be performed on a code generator data object created by compiling or interpreting the source code 300.

The non-distributed to distributed transcompiler can scan the source code 300 to populate the code generator object with information and attributes of the source code 300. Some of the information and attributes stored in the code generator object can be obtained by compiling or interpreting the source code 300 using another compiler or interpreter designed for the programming language that the source code 300 is written in. The code generator object can categorize the different functions within the source code 300 by type. For instance, the code can be scanned to determine whether a certain function is an "aggregation" type of function or an "instance" (non-aggregation) type of function. The scanning may also be based on configuration files for the source code and configuration files for the functions called within the source code. The configuration files can also contain information on paths to certain data and metadata, user preferences, and information on the transcompiler and the distributed framework implementation (e.g., version information).

"Aggregation" type functions generally include aggregative functions that perform operations across different categories, such as a "group by" function, a "sum by account number" function, or a "data partition by category" function. Instance or non-aggregation type functions generally include non-aggregative functions, such as mathematical transformations. The aggregation type may be determined by scanning a configuration file associated with the function to determine whether an aggregation-type flag is set (e.g., if the aggregation type flag is set, the function is an aggregation function). The configuration file settings may be set during development of the non-distributed software.

As shown in FIG. 3, the non-distributed to distributed compiler can scan the source code or code generator object to identify five data loops and other attributes of the source code 300. Based on the scan of the source code 300, the non-distributed to distributed compiler can determine that a first loop 311 loops over input data "wordFreq" and outputs to output data "temp1." As such, the compiler can tag "temp1" 312 as the output data for the first loop 311 and can tag "wordFreq" 313 as the input data for the first loop 311.

Based on the scan of the source code 300, the non-distributed to distributed compiler can determine that a second loop 321 implements a "summarize" function and loops over the input data "temp1." The compiler further determines that second loop 321 performs a frequency count by "category," where the category is "word1." The compiler can further determine that the second loop 321 outputs to output data "temp_agg." As such, the compiler can tag "summarize" 322 as the function of the second loop 321, "temp1" 323 as the input data, "temp_agg" 324 as the output data, and "category(word1)" 325 as the "by-statement" (an aggregative type function) for the second loop 321. A configuration file associated with the "summarize" 322 function can include an aggregation flag that is set (e.g., ON. YES, or 1) and it can further include a grouping indicator that indicates aggregation or grouping based on the "word1" parameter of "category." During analysis of the source code 300, the non-distributed to distributed compiler can also scan the corresponding configuration files or libraries. Accordingly, the compiler can determine that the "summarize" 322 function is an aggregation type of function.

Based on the scan of the source code 300, the non-distributed to distributed compiler can determine that a third loop 331 implements the "summarize" function and loops over the input data "temp1." The compiler can further determine that the third loop 331 performs frequency count by "category," where the category is "word2." In addition, the compiler can further determine that the third loop 331 outputs to output data "temp_agg." As such, the compiler can tag "summarize" 332 as the function of the third loop 331, "temp1" 333 as the input data, "temp_agg" 334 as the output data, and "category(word2)" 335 as the "by-statement" (an aggregative type function) for the third loop 331. A configuration file associated with the "summarize" function 332 can include an aggregation flag that is set (e.g., ON, YES, or 1) and it can further include a grouping indicator that indicates aggregation or grouping based on the "word2" parameter of "category." During analysis of the source code 300, the non-distributed to distributed compiler can also scan the corresponding configuration files or libraries. Accordingly, the compiler can determine that the "summarize" 332 function is an aggregation type of function.

Based on the scan of the source code 300, the non-distributed to distributed compiler can determine that a fourth loop 341 implements the "summarize" function and loops over the input data "temp1." The compiler further determines that fourth loop 341 performs frequency count by "category," where the category is "word 3." The compiler can further determine that the fourth loop 341 outputs to output data "temp_agg." As such, the compiler can tag "summarize" 342 as the function of the fourth loop 341, "temp1" 343 as the input data. "temp_agg" 344 as the output data, and "category(word3)" 345 as the "by-statement" (an aggregative type function) for the fourth loop 341. A configuration file associated with the "summarize" 342 function can include an aggregation flag that is set (e.g., ON. YES, or 1) and it can further include a grouping indicator that indicates aggregation or grouping based on the "word3" parameter of "category." During analysis of the source code 300, the non-distributed to distributed compiler can also scan the corresponding configuration files or libraries. Accordingly, the compiler can determine that the "summarize" 342 function is an aggregation type of function.

Based on the scan of the source code 300, the non-distributed to distributed compiler can determine that a fifth loop 351 receiving "temp_agg" as input data and outputs to output data "statistics_1." As such, the compiler can tag "statistics_1" 352 as the output data, and "temp_agg" 353 as the input data of the fifth loop 351.

By scanning and analyzing the source code 300, the compiler can identify each loop within the source code 300, the input and output of each loop, and the aggregation type of each loop. The compiler can use these attributes to build and link MapReduce jobs to implement the software program on a distributed computing system. For instance, each loop of the source code 300 can be implemented as its own MapReduce job. Loops having aggregation type functions (e.g., the second loop 321, the third loop 331, and the fourth loop 341) can be implemented as a MapReduce job having both mapper code and reducer code whereas loops having non-aggregation type functions ("instance" functions, such as the first loop 311 and the fifth loop 351) can be implemented as a MapReduce job having only mapper code (e.g., no reducers are used or the reducer code is implemented as a pass-through).

MapReduce jobs having only mappers may not need to use a mapper key. However, a mapper key could be used in mapper-only jobs in order to sort the data by the mapper key. MapReduce jobs having both mappers and reducers require a mapper key to be selected such that key-value pairs having the same key can be sorted and merged for sending to a single reducer as discussed above with reference to FIG. 2.

The compiler can determine the mapper keys for MapReduce jobs based on the parameters of the aggregative type functions (e.g., "by-statements") within the corresponding loop of the non-distributed source code. For instance, the second loop 321 includes the bystatement 325 "category (word1)." Since the second loop 321 performs frequency counting using "word1" as the category, "word1" should be the mapper key for the MapReduce job corresponding to the second loop 321. The compiler can determine that "category (word1)" 325 within the second loop 321 is a "by—statement" and that "word1" is the parameter of the by-statement. Accordingly, the compiler can determine "word1" to be the mapper key for the second MapReduce job corresponding to the second loop 321. By the same technique, the compiler can determine "word2" to be the mapper key for the third MapReduce job corresponding to the third loop 331 and "word3" to be the mapper key for the fourth MapReduce job corresponding to the fourth loop 341.

Besides the mapper and reducer code of the MapReduce jobs, the distributed software package requires information on how the MapReduce jobs should be arranged. Thus, after the compiler has determined the MapReduce jobs and the mapper keys for the MapReduce jobs having both mapper and reducer code, the compiler can determine how to arrange the MapReduce jobs to implement the functionality of the source code 300.

Figure 4:
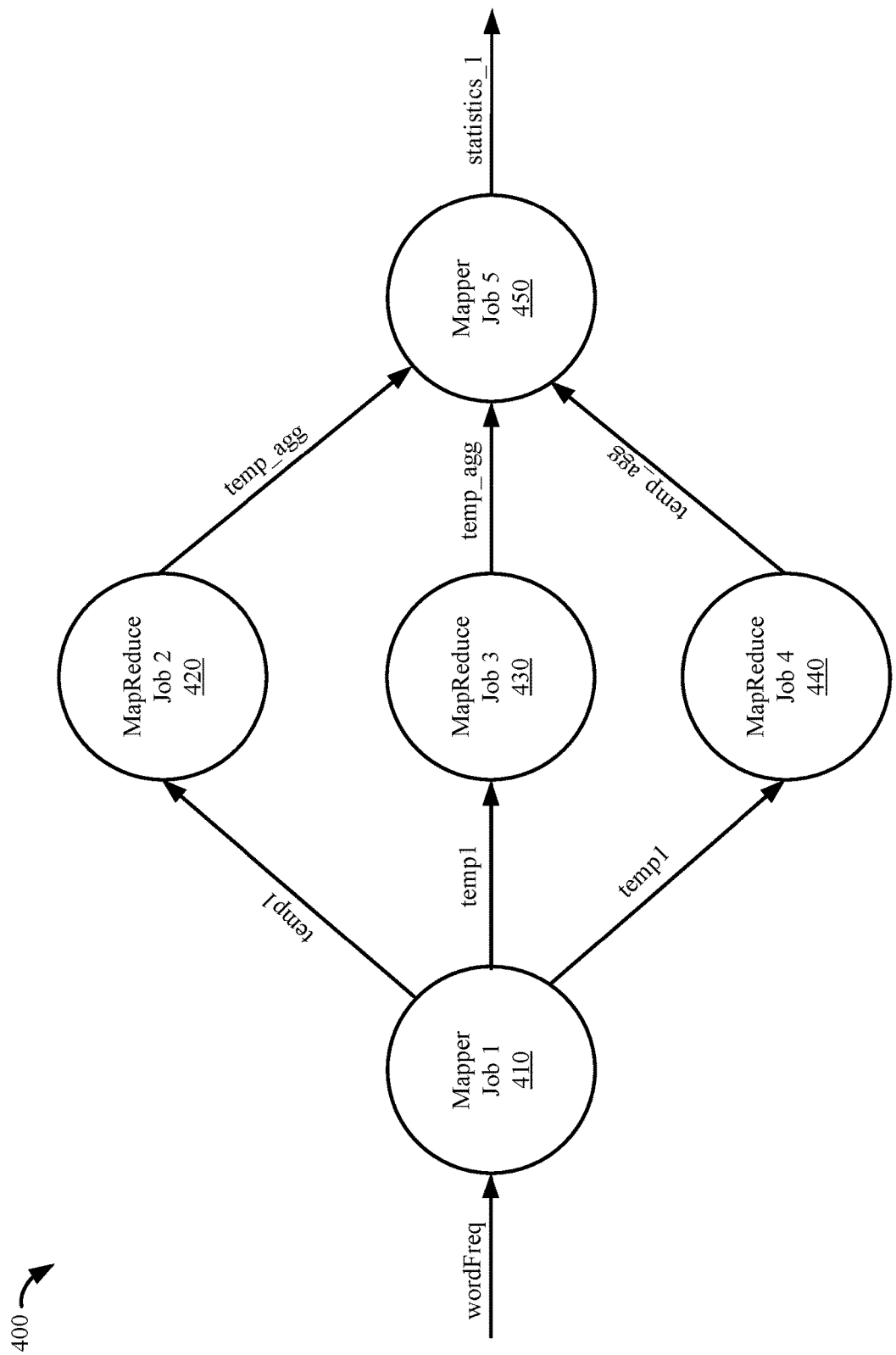
FIG. 4 shows a data flow diagram of input and output connections between a set of MapReduce jobs in a distributed software package based on the excerpt of source code of FIG. 2, in accordance with some embodiments.

FIG. 4 shows a data flow diagram of input and output connections between a set of MapReduce jobs in a distributed software package based on the excerpt of source code of FIG. 2, in accordance with some embodiments. As discussed above, each loop within the source code 300 can be implemented in a MapReduce job. The MapReduce jobs can have the same inputs and outputs as the corresponding loops in the source code 300. The compiler can determine the connections between the inputs and outputs of the loops within the source code 300 (e.g., an output of one loop being the input to another loop) and tie the MapReduce jobs together based on these connections.

The distributed software package includes five MapReduce jobs corresponding to the five loops shown in FIG. 3 (e.g., loops 311, 321, 331, 341, and 351). The five MapReduce jobs of the distributed software package include a first MapReduce job "Mapper Job 1" 410 corresponding to the first loop 311 of the source code 300 of FIG. 3. The distributed software package further includes a second MapReduce job "MapReduce Job 2" 420 corresponding to the second loop 321 of the source code 300 of FIG. 3. The distributed software package further includes a third MapReduce job "MapReduce Job 3" 430 corresponding to the third loop 331 of the source code 300 of FIG. 3. The distributed software package further includes a fourth MapReduce job "MapReduce Job 4" 440 corresponding to the fourth loop 341 of the source code 300 of FIG. 3. And, the distributed software package further includes a fifth MapReduce job "MapReduce Job 5" 450 corresponding to the fifth loop 351 of the source code 300 of FIG. 3.

As shown in the directed graph of FIG. 4, "Mapper Job 1" 410 can receive "wordFreq" as input. Accordingly, the compiler can generate distributed software code to receive and store the "wordFreq" input data within the distributed file system of the distributed computing system.

The output of "Mapper job 1" 410 is output data "temp 1," which is provided as input data to "MapReduce Job 2" 420, "MapReduce Job 3" 430, and "MapReduce Job 4" 440. Accordingly, the compiler can generate distributed software code to link the output of Mapper job 138 410 to the inputs of MapReduce Job 2" 420. "MapReduce Job 3" 430, and "MapReduce Job 4" 440

As discussed above with respect to FIG. 3, the second loop 321, third loop 331, and fourth loop 341 all output to "temp_agg," which is input data to the fifth loop 351. Therefore, MapReduce Job 2" 420, "MapReduce Job 3" 430, and "MapReduce Job 4" 440 each provide output data "temp_agg" to "Mapper Job 5" 450. Accordingly, the compiler can generate distributed software code to link the output of MapReduce Job 2" 420, "MapReduce Job 3" 430, and "MapReduce Job 4" 440 to the input of "Mapper Job 5" 450.

As discussed above with respect to FIG. 3, the output of the fifth loop 351 is output data "statistics_1." Therefore, the output of "Mapper Job 5" 450 is also output data "statistics_1." Accordingly, the compiler can generate distributed software code to output "statistics_1" to the distributed file system.

Using the process described above with respect to FIGS. 2-4, the non-distributed source code to distributed software compiler can generate a distributed software package including numerous MapReduce jobs having mapper code, using appropriate mapper keys and reducer code as needed. In addition, the distributed software package also includes instructions to link the MapReduce jobs together, such that the necessary input and output connections and functionality of the non-distributed source code are maintained. Moreover, this compiler can perform the compilation process automatically based on analysis of the non-distributed source code and corresponding configuration files without requiring input from a software developer. As such, the compiler described herein enables software programs, written in data-driven programming languages for non-distributed computer systems, to be automatically compiled for use on a distributed computing system, thereby improving their speed and efficiency in processing very large data sets compared to the same software functionality implemented on a non-distributed system.

III. Mapper Key Selection Based on Connections Between the Map Reduce Jobs

As discussed above, the compiler can determine the mapper keys to be used for MapReduce jobs. The distributed software package can be optimized by selecting the mapper key, not only based on the information within a single loop, but further based on the connections between the loops. By changing or adding certain mapper keys to earlier steps in the process, the compiler can pre-sort the data so that later MapReduce jobs are more efficient. For instance, the compiler may follow the flow of data, from the output of one loop to the input of a second loop, and then the output of the second loop being input to a third loop, and so on. The compiler may be able to determine that a previous MapReduce job should have a different mapper key, or it may determine that a MapReduce job only having mapper code should use a certain mapper key instead of not using any key. In some embodiments including complex MapReduce jobs, the compiler may change the mapper key several times in response to a MapReduce job creating different data summaries that are merged in later steps of the job.

The compiler can first look at a single MapReduce job in isolation to determine its mapper key. Then, the compiler can analyze the input-to-output connections to prior and later MapReduce jobs to determine whether mapper keys should be added or changed to optimize later MapReduce jobs.

FIG. 5 shows a table 500 of mapper keys determined by a distributed software compiler for a set MapReduce jobs, in accordance with some embodiments. Table 500 has three rows, one row for each of three MapReduce jobs, and three columns, one column for each of the three scans used in selecting and optimizing the mapper keys for the three MapReduce jobs.

In this embodiment, the distributed software package can be implemented in a distributed computing system that stores historical transaction data for a plurality of different accounts. The distributed software package can be one portion of a larger system that can be used to determine fraud risk scores for new transactions using a fraud model based on the historical transaction data. The fraud model may be periodically updated. As part of a debugging process to ensure that the updated fraud model is working properly, the distribution of fraud risk scores in the updated model can be determined and compared to the distribution of fraud risk scores in previous versions of the fraud model. If the distribution changes too drastically compared to previous versions, this may indicate that the updated model is inaccurate.

The distributed software package in this example includes three MapReduce jobs in order to generate a summary of the distribution of fraud risk scores over a certain period of time. The first MapReduce job can receive a table of transactions conducted by a plurality of different accounts as input. The first MapReduce job can filter the transactions to recent transactions by excluding transactions conducted before a certain date and provide the list of filtered transactions as output. The first MapReduce job includes only mapper code, no reducer code, since there is no aggregation that would be performed by a reducer. Therefore, there is no mapper key determined for the first MapReduce job.

The mapper keys selected for each of the three MapReduce jobs after analyzing only the first MapReduce job is shown in the first column of table 500, labeled as "1$^{st}$ scan." As shown in the table 500, no key is used for the first MapReduce job since it includes only a mapper and no reducer. The two other cells within the first column indicating the mapper keys selected for the other MapReduce jobs are empty since the compiler has only analyzed the first MapReduce job during at this point.

The second MapReduce job can receive the filtered list of transactions from the first MapReduce job as input and outputs the fraud risk for each account based on the input transaction data. Since the transactions are grouped by their associated account number in order to determine a score for a particular account, the compiler can determine that this MapReduce job will need mapper code and reducer code and can determine that the mapper key is the "account" number. In addition, the second scan of the software by the compiler will consider the previously analyzed MapReduce jobs.

As discussed above, the first MapReduce job includes only a mapper and does not use a mapper key since no aggregation is performed. However, after performing a second scan of the software package, the compiler may determine that the transaction data would be sorted by account in order for the second MapReduce job to determine the score for each account. Thus, the compiler can determine that the software package could be optimized by moving some of the processing performed by the second MapReduce job to the first MapReduce job since both of these MapReduce jobs operate on the transaction data. Accordingly, the compiler can determine that the first MapReduce job should use the "account" as the mapper key so that the transaction data is pre-sorted by account when it is input to the second MapReduce job. Thus, the compiler has improved the efficiency of the distributed software package by more evenly distributing the processing to be performed across the three MapReduce jobs.

The third MapReduce job can receive the scores of the accounts from the second MapReduce job as input and generate a summary of the distribution of the scores. For example, the summary can indicate the number of scores above 50, the average score, etc.

These statistics require aggregating across the scores. Accordingly, the compiler can determine that the third MapReduce job should use the "score" as the mapper key. As shown in the table 500, after the 3$^{rd}$ scan of the software package, the compiler has determined that the first MapReduce job and the second MapReduce job will use the "account" as the mapper key and that the third MapReduce job will use the "score" as the mapper key.

Thus, the compiler can analyze MapReduce jobs that are connected to one another in order to determine that processing can be redistributed across the different MapReduce jobs, thereby improving efficiency. Then, the compiler can redistribute the processing by adding mapper keys to MapReduce jobs that would otherwise not use a mapper key such that certain data is pre-sorted when it is input to a later MapReduce job that would otherwise sort the data itself.

IV. Optimizing Distributed Software Packages Using an Unsupervised Searcher

Figure 6:
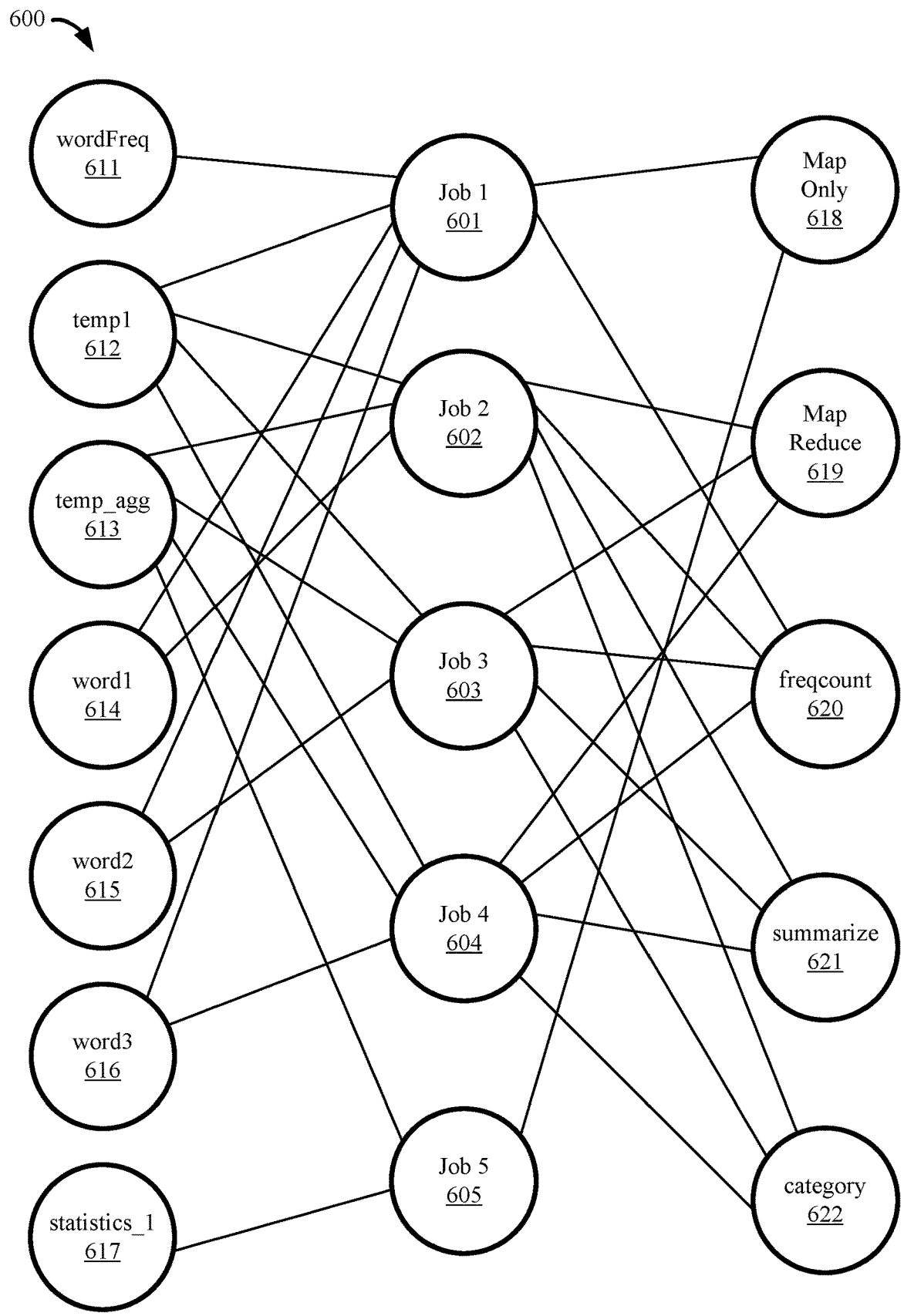
FIG. 6 shows a simplified graph representation of a portion of a distributed software package based on the excerpt of the source code of FIG. 2, in accordance with some embodiments.

A graph of the data connections between the various elements of a distributed software package program is generated during compilation. This graph can show the connections between the MapReduce jobs, the functions called, the input and output data used, and another other variables, data objects, and attributes used during compilation. FIG. 6 shows a simplified graph 600 of a portion of a distributed software package based on the excerpt of source code of FIG. 2, in accordance with some embodiments. While the connections between the nodes (e.g., vertices) in the graph 600 are described with reference to FIG. 3, the connections are based on the generated distributed software packaged, and are not directly related to the underlying source code shown in FIG. 3.

The distributed software package generated by the distributed compiler can include five MapReduce jobs as discussed above. These MapReduce jobs can be represented by nodes in the 600, including a first MapReduce Job. "Job 1" 601, a second MapReduce Job, "Job 2" 602, a third MapReduce Job, "Job 3" 603, a fourth MapReduce Job, "Job 4" 604, and a fifth MapReduce Job, "Job 5" 605. As discussed above, Job 1 601 and Job 5 605 may only include mapper functions, not reducer functions, and can be referred to as "Map Only" type MapReduce functions. Accordingly. Job 1 601 and Job 5 605 are connected to the "Map Only" node 618 in the graph 600. "Job 3" 603. "Job 4" 604, and "Job 5" 605 include both mapping and reducing functions, as discussed above. Accordingly. "Job 3" 603, "Job 4" 604, and "Job 5" 605 are each connected to the "MapReduce" node 619 in the graph 600.

The graph 600 further includes a "freqcount" node 620 corresponding to the "freqcount" function in the source code shown in FIG. 2. The "freqcount" node 620 is called in the first loop 311, the second loop 321, the third loop 331, and the fourth loop 341 as shown in FIG. 3. The functionality of the first loop 311 can be implemented by the first MapReduce Job 601. The functionality of the second loop 321 can be implemented by the second MapReduce Job 602. The functionality of the third loop 331 can be implemented by the third MapReduce Job 603. And, the functionality of the fourth loop 311 can be implemented by the fourth MapReduce Job 604. Accordingly, the "freqcount" node 620 can be connected to the first MapReduce Job 601, the second MapReduce Job 602, the third MapReduce Job 603, and the fourth MapReduce Job 604.

The graph 600 further includes a "summarize" node 621 connected to the "Job 2" node 602, the "Job 3" node 603, and the "Job 4" node 604. These nodes may be connected based on the "summarize" function being used in the MapReduce jobs having corresponding loops (e.g., the second loop 321, third loop 331, and the fourth loop 341), as shown in FIG. 3. The graph 600 further includes a "category" node 621 connected to the "Job 2" node 602, the "Job 3" node 603, and the "Job 4" node 604. These nodes may be connected based on the "summarize" function being used in the MapReduce jobs having corresponding loops (e.g., the second loop 321, third loop 331, and the fourth loop 341), as shown in FIG. 3.

The graph 600 further includes a "wordFreq" node 611 connected to the "Job 1" node 601. These nodes may be connected based on the "wordFreq" data being used in the MapReduce jobs having corresponding loop (e.g., the first loop 311), as shown in FIG. 3.

The graph 600 further includes a "temp1" node 621 connected to the "Job 2" node 602, the "Job 3" node 603, and the "Job 4" node 604. These nodes may be connected based on the "temp1" data being used in the MapReduce jobs having corresponding loops (e.g., the second loop 321, third loop 331, and the fourth loop 341), as shown in FIG. 3.

The graph 600 further includes a "temp_agg" node 621 connected to the "Job 2" node 602, the "Job 3" node 603, the "Job 4" node 604, and the "Job 5" node 605. These nodes may be connected based on the "temp_agg" data being used in the MapReduce jobs having corresponding loops (e.g., the second loop 321, third loop 331, the fourth loop 341, and the fifth loop 351), as shown in FIG. 3.

The graph 600 further includes a "word1" node 614 connected to the "Job 1" node 601 and the "Job 2" node 602.

These nodes may be connected based on the "word1" variable being used in the MapReduce jobs having corresponding loops (e.g., the first loop 311 and the second loop 321), as shown in FIG. 3.

The graph 600 further includes a "word2" node 615 connected to the "Job 1" node 601 and the "Job 3" node 603. These nodes may be connected based on the "word2" variable being used in the MapReduce jobs having corresponding loops (e.g., the first loop 311 and the third loop 331), as shown in FIG. 3.

The graph 600 further includes a "word3" node 616 connected to the "Job 1" node 601 and the "Job 4" node 604. These nodes may be connected based on the "word3" variable being used in the MapReduce jobs having corresponding loops (e.g., the first loop 311 and the fourth loop 331), as shown in FIG. 3.

The graph 600 further includes a "statistics_1" node 617 connected to the "Job 5" node 605. These nodes may be connected based on the "statistics_1" data being used in the MapReduce jobs having corresponding loops (e.g., the fifth loop 351), as shown in FIG. 3.

An unsupervised search optimization algorithm, such as the Ant Colony algorithm, may be used to determine optimal paths between the elements of the software package using the graph 600. For instance, the optimization technique may be used to determine a shortest path to a given node or a set of paths that achieves a particular goal (e.g., including a certain set of nodes) at the lowest cost. The costs for a particular path between nodes can be based on an amount of system memory resources used, an amount of computer processing resources used, and an amount of storage memory resources used. The cost paths can be determined by associating a collection of vertices with a set outcome that has its weights calculated. The search optimization algorithm can produce the collection of vertices that has the lowest cost. These vertices can correspond with a sequence of actions the compiler can perform when compiling code (e.g., whether to move certain programming logic into the mapper function from the reducer function, or vice versa). This algorithm may lead to detecting new more efficient paths in the graph 600, which correspond to more efficient operation of the corresponding software program.

The cost values used by the search optimization algorithm can be determined based on usage logs and statistics from implementing previous versions of the distributed software on the distributed software framework. This optimization process can be iteratively performed using the latest optimized version of the distributed software and updated cost values in order to further improve performance.

In one example, the search optimization algorithm can use the graph 600 to determine that the software package would be optimized by moving code from the mapper code into the reducer code, or from the reducer code into the mapper code. If such changes were made to the mapping and reducing algorithms, the resulting graph 600 would have different connections between the MapReduce Jobs and the functions accordingly.

In another example, the search optimization algorithm can use the graph 600 to determine that the software package would be optimized by moving certain mathematical transformation steps from one MapReduce job to a different MapReduce job. The search optimization algorithm can also use the graph 600 to determine that an intensive processing operations should be split into separate steps. The search optimization algorithm may also determine that certain processes in the software package should be combined. The compiler can then use the rules determined by the search optimization to modify the compilation parameters in order to optimize the distributed software package.

V. Exemplary Methods

Figure 7:
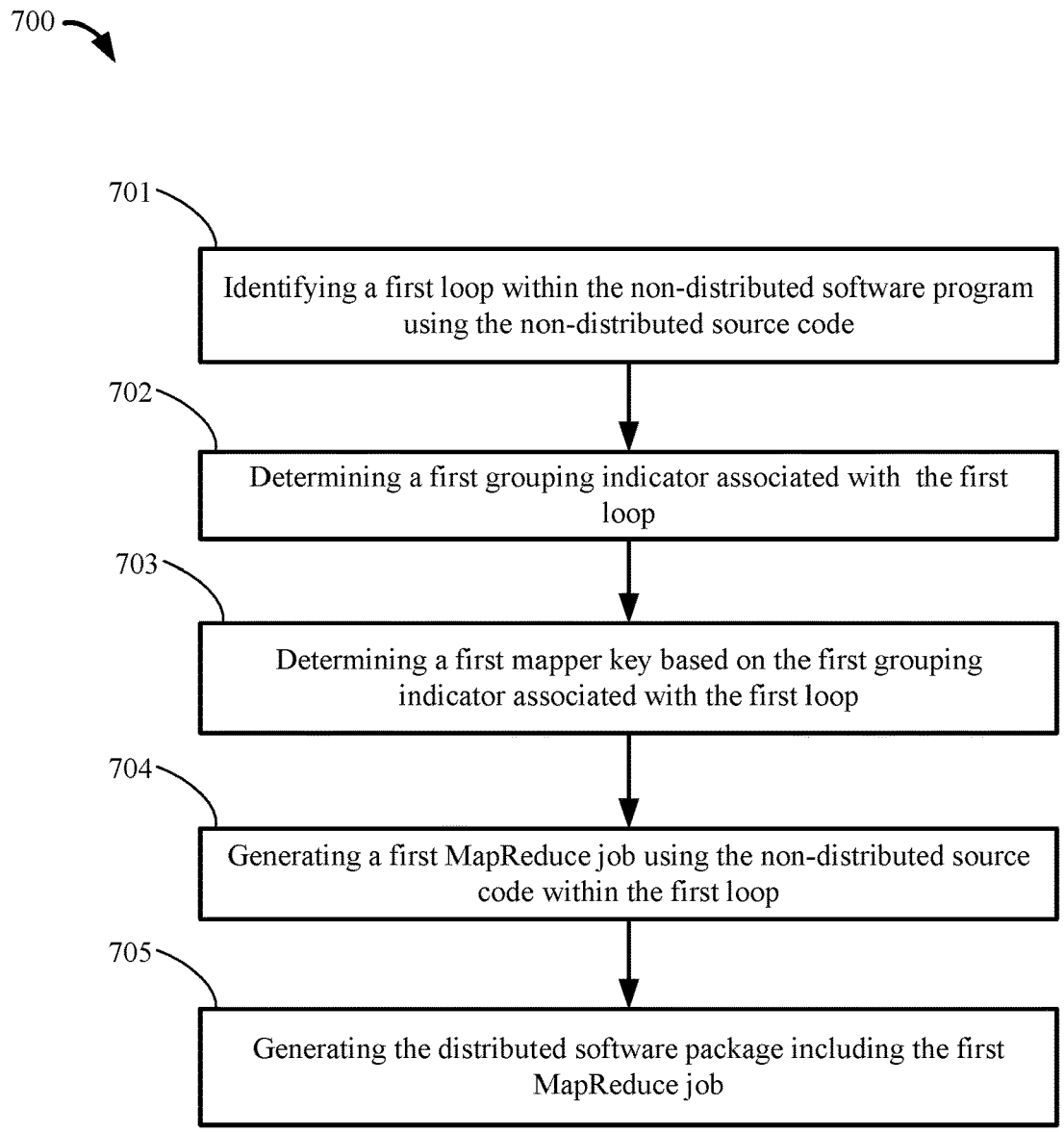
FIG. 7 shows a flowchart of a method for compiling a distributed software package using source code written in a data-driven programming language for implementation on a non-distributed computer system, in accordance with some embodiments.

FIG. 7 shows a flowchart 700 of a method for compiling a distributed software package using source code written in a data-driven programming language for implementation on a non-distributed computer system, in accordance with some embodiments.

The method can include a first step 701 of identifying a first loop within the non-distributed software program using the non-distributed source code. The first loop can be identified as described above with reference to FIG. 3. For instance, the first loop can be identified by determining a first function within the non-distributed source code, the first function looping over a set of input data, performing certain operations or transformations on the first item in the set, then the next item in the set, and so on.

The method can further include a second step 702 of determining a first grouping indicator associated with the first loop. The grouping indicator may be included in a configuration file associated with the non-distributed source code or the function of the first loop itself. The configuration file may associate the function of the first loop with a grouping indicator, indicating the particular piece of data or type of data that the operation performed by the first loop is grouped by.

For instance, a loop that determines the word count of a particular word (e.g., "word1") may be associated with a grouping indicator that indicates the "word" as the grouping category. In another example, a loop that performs the function of sorting a set of accounts by the account number may be associated with a grouping indicator that indicates the "account number" as the grouping category. In another example, a loop that performs the function of sorting a set of accounts by the account owner's name may be associated with a grouping indicator that indicates the "owner name" as the grouping category. Non-aggregative type functions may not be associated with a grouping indicator in their corresponding configuration files.

In some embodiments, the method can further include a step of identifying a first aggregation type of the first loop. The aggregation type may be aggregative or non-aggregative. The aggregation type may be included in a configuration file associated with the non-distributed source code or the function of the first loop itself. The aggregation type in the configuration file may be an aggregation flag that can be set to ON (e.g., an aggregation flag bit is set to 1) or OFF (e.g., an aggregation flag bit is set to 0). The aggregation flag being set to ON indicates that a particular function associated with that aggregation flag is an aggregative type of function, which may be converted to a MapReduce mapper as discussed above. A grouping indicator that indicates which data type or field the data is being aggregated by can also be included in the configuration file.

The method can further include a second step 703 of determining a first mapper key based on the first grouping indicator associated with the first loop. For instance, if the grouping indicator for the first loop is "word1" then the compiler can determine that the mapper key for a first MapReduce Job is also "word1." In another example, the compiler can determine that the mapper key for a loop that sorts a set of accounts by the "account number" is the "account number" based on the grouping indicator being set "account number." In some embodiments, the determining of the first mapper key is further based on the first aggregation type being aggregative. For instance, if a loop implements an aggregative type function, then the compiler can determine a mapper key for that function (e.g., based on a configuration file for that function). Whereas, if a loop implements a non-aggregative type function, then the compiler may not determine a mapper key for that function.

The method can further include a fourth step 704 of generating a first MapReduce job using the non-distributed source code within the first loop. The first MapReduce job may implement the same functionality as the first loop using the first mapper key.

In one example, the compiler can generate a first mapper of a first MapReduce job by analyzing a loop that counts the frequency of "word1" in a set of input data "temp1" (e.g., the first loop 321), and determining mapper code that takes "temp1" as input data and outputs a key-value pair of <"word1", 1> for each instance of "word1" in the input data "temp1." The input data "temp1" may be split among numerous different Mappers within a cluster of computers, as described above, such that each Mapper only operations on a portion of "temp1." The compiler can generate reducer code that can receive the key-value pairs from a plurality of mappers and combine the key-value pairs into an output key-value pair.

The compiler can then generate a first reducer of the first MapReduce job by determining reducer code that aggregates (e.g., sums) the values of the key-value pairs having the same key. That is, the compiler can generate reducer code that receives a certain number (e.g., 10) of key-value pairs of <"word1" 0.1>, sums up the values of "1" for each of the certain number (e.g., 10), and then outputs a key-value pair having "word1" as the key and the certain number (e.g., 10) as the value.

The method can further include a second step 705 of generating the distributed software package including the first MapReduce job. The distributed software package can be generated using a compiler for a distributed software framework (e.g., a Hadoop compiler) and the first MapReduce job.

In some embodiments, the method can further include steps for identifying a second loop within the non-distributed software program using the non-distributed source code and generating a second MapReduce job using the non-distributed source code within the second loop. In addition, the method can further include steps for identifying a first input of the first loop and a first output of the first loop, identifying a second input of the second loop and a second output of the second loop. Using this information, the method can further include of a step of generating a directed input-output graph including the first MapReduce job and the second MapReduce job based on the first input of the first loop, the first output of the first loop, the second input of the second loop, and the second output of the first loop.

In this directed input-output graph, an output of the first MapReduce job or the second MapReduce job may be connected to the input of the other of the first MapReduce job or the second MapReduce job. The compiler can generate the distributed software package based on the directed input-output graph. For instance, the compiler can generate distributed software code that links the first MapReduce Job to the second MapReduce job such that the output of one Job is input to the other Job according to the distributed framework.

In some embodiments the method can further include analyzing the non-distributed source code using a second compiler or interpreter for a programming language that the non-distributed source code is written in. The second compiler may create a code generator object for the non-distributed software program based on this analysis. The transcompiler can identify the first loop within the non-distributed software program using the information in the code generator object. In addition, the transcompiler can identify the first input, the first output, and the first grouping indicator of the first loop using the information in the code generator object.

In some embodiments, the method can further include executing the distributed software package using a distributed computing system. The distributed computing system including more than one computer systems in communication with each other over a network. For instance, the distributed computing system can be a cluster of computers implementing the Hadoop framework. In some embodiments, the method can further include generating usage statistics using on a log based on the execution of the distributed software package by the distributed computing system. Then, the transcompiler can regenerate the first MapReduce job based on the usage statistics. The transcompiler may move certain functionality between Mappers or Reducers based on the usage statistics in order to more evenly distribute the processing demands between them.

In some embodiments, the method can further include generating a usage table based on the monitoring of the execution of the distributed software package and then identifying one or more rules for regenerating the distributed software package using a machine learning searching algorithm (e.g., Ant Colony).

While the steps of the method are described in a particular order, the ordering of the steps may be rearranged, and steps may be added or removed, in other embodiments according to their particular implementation.

VI. Exemplary Computer System

A computer system can include a single computer apparatus or multiple computer apparatuses. A computer system can include desktop and laptop computers, tablets, mobile phones and other mobile devices. Subsystems of a computer system can be interconnected via a system bus. The computer system can include additional subsystems such as a printer, keyboard, storage device, monitor, etc. Peripherals and input/output (I/O) devices can couple to an I/O controller and can be connected to the computer system by any suitable means (e.g., USB or FireWire). In addition, an I/O port or external interface (e.g. Ethernet. Wi-Fi, etc.) can be used to connect computer system to a wide area network (e.g., the Internet). The interconnection via the system bus can enable a central processor of the computer system to communicate with each subsystem and to control the execution of instructions from a system memory or a storage device (e.g., a fixed disk, such as a hard drive, or optical disk), as well as the exchange of information between subsystems. The system memory and/or the storage device may embody a computer readable medium. Any of the data mentioned herein can be output from one subsystem to another subsystem, or output to a user.

The above description is illustrative and is not restrictive. Many variations of the invention may become apparent to those skilled in the art upon review of the disclosure. The scope of the invention may, therefore, be determined not with reference to the above description, but instead may be determined with reference to the pending claims along with their full scope or equivalents.

It should be understood that any of the embodiments of the present invention can be implemented in the form of control logic using hardware (e.g. an application specific integrated circuit or field programmable gate array) and/or using computer software with a generally programmable processor in a modular or integrated manner. As used herein, a processor includes a single-core processor, multi-core processor on a same integrated chip, or multiple processing units on a single circuit board or across a network.

Any of the software components or functions described in this application may be implemented as software code to be executed by a processor using any suitable computer language such as, for example, Python, LISP, Ada, SQL, Perl, Java, C, C++, C#, Objective-C, Swift, or other programming languages. The software code may be stored as a series of instructions or commands on a computer readable medium for storage and/or transmission. A suitable non-transitory computer readable medium can include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Storage media and computer-readable media for containing code, or portions of code, can include any appropriate media known or used in the art, including storage media and communication media, such as but not limited to volatile and non-volatile, removable and non-removable media implemented in any method or technology for storage and/or transmission of information such as computer-readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, data signals, data transmissions, or any other medium which can be used to store or transmit the desired information and which can be accessed by the computer.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer product (e.g. a hard drive, a CD, or an entire computer system), and may be present on or within different computer products within a system or network. A computer system may include a monitor, printer, or other suitable display for providing any of the results mentioned herein to a user.

Any of the methods described herein may be totally or partially performed with a computer system including one or more processors, which can be configured to perform the steps. Thus, embodiments can be directed to computer systems configured to perform the steps of any of the methods described herein, potentially with different components performing a respective steps or a respective group of steps. Although presented as numbered steps, steps of methods herein can be performed at a same time or in a different order. Additionally, portions of these steps may be used with portions of other steps from other methods. Also, all or portions of a step may be optional. Additionally, any of the steps of any of the methods can be performed with modules, units, circuits, or other means for performing these steps.

The specific details of particular embodiments may be combined in any suitable manner without departing from the spirit and scope of embodiments of the invention.

However, other embodiments of the invention may be directed to specific embodiments relating to each individual aspect, or specific combinations of these individual aspects.

The above description of example embodiments has been presented for the purposes of illustration and description. It is not intended to be exhaustive or to limit the embodiments to the precise form described, and many modifications and variations are possible in light of the teaching above.

A recitation of "a," "an" or "the" is intended to mean "one or more" unless specifically indicated to the contrary. The use of "or" is intended to mean an "inclusive or" and not an "exclusive or" unless specifically indicated to the contrary. The use of the terms "first," "second," "third," "fourth," "fifth," "sixth," "seventh," "eighth," "ninth," "tenth," and so forth, do not necessarily indicate an ordering or a numbering of different elements and may simply be used for naming purposes to clarify distinct elements.

All patents, patent applications, publications, and descriptions mentioned herein are incorporated by reference in their entirety for all purposes. None is admitted to be prior art.

What is claimed is:

1. A method for transcompiling a non-distributed source code for a non-distributed software program into a distributed software package for implementation on a distributed computing system, the method comprising:
   identifying a first loop within the non-distributed software program using the non-distributed source code;
   determining a first grouping indicator associated with the first loop;
   determining a first mapper key based on the first grouping indicator associated with the first loop;
   generating a first MapReduce job based on the first mapper key and the non-distributed source code within the first loop, the first MapReduce job including a first mapper code and a first reducer code;
   generating the distributed software package, the distributed software package including the first MapReduce job;
   monitoring an execution of the distributed software package;
   generating a usage table based on the monitoring of the execution of the distributed software package;
   identifying one or more rules for regenerating the distributed software package using a machine learning searching algorithm;
   moving a set of code functionality from a reducer of the first MapReduce job into a mapper of the first MapReduce job based on the usage table and the one or more rules;
   regenerating the first MapReduce job; and
   regenerating the distributed software package using the regenerated first MapReduce job.

2. The method of claim 1, further comprising identifying a first aggregation type of the first loop, the aggregation type being aggregative, and wherein the determining of the first mapper key is further based on the first aggregation type being aggregative.

3. The method of claim 1, further comprising:
   identifying a first input of the first loop and a first output of the first loop;
   identifying a second loop within the non-distributed software program using the non-distributed source code;
   identifying a second input of the second loop and a second output of the second loop;
   generating a second MapReduce job using the non-distributed source code within the second loop; and
   generating a directed input-output graph including the first MapReduce job and the second MapReduce job based on the first input of the first loop, the first output of the first loop, the second input of the second loop, and the second output of the second loop, an output of the first MapReduce job or the second MapReduce job being connected to the input of the other of the first MapReduce job or the second MapReduce job,
   wherein the generating of the distributed software package is further based on the directed input-output graph, and wherein the distributed software package further includes the second MapReduce job.

4. The method of claim 3, further comprising analyzing the non-distributed source code using a second compiler or interpreter for a programming language that the non-distributed source code is written in, the second compiler creating a code generator object for the non-distributed software program,
   wherein the identifying of the first loop within the non-distributed software program is based on the code generator object,
   wherein the identifying of the first input, the first output, and the first grouping indicator is based on the code generator object,
   wherein the identifying of the second loop is based on the code generator object, and
   wherein the identifying of the second input of the second loop and the second output of the second loop is based on the code generator object.

5. The method of claim 4, wherein the analyzing of the non-distributed source code using the second compiler determines a first aggregation type associated with the first loop using a configuration file for a function performed by the first loop, and wherein the second compiler determines the first grouping indicator.

6. The method of claim 1, further comprising:
   generating a usage statistics using on a log based on the execution of the distributed software package by the distributed computing system;
   regenerating the first MapReduce job based on the usage statistics; and
   regenerating the distributed software package using the regenerated the first MapReduce job.

7. A method comprising:
   identifying a first loop within a non-distributed software program using a non-distributed source code;
   determining a first grouping indicator associated with the first loop;
   determining a first mapper key based on the first grouping indicator associated with the first loop;
   generating a first MapReduce job based on the first mapper key and the non-distributed source code within the first loop, the first MapReduce job including a first mapper code and a first reducer code;
   generating a distributed software package, the distributed software package including the first MapReduce job;
   identifying a first input of the first loop and a first output of the first loop;
   identifying a second loop within the non-distributed software program using the non-distributed source code;
   identifying a second input of the second loop and a second output of the second loop;
   generating a second MapReduce job using the non-distributed source code within the second loop; and
   generating a directed input-output graph including the first MapReduce job and the second MapReduce job based on the first input of the first loop, the first output of the first loop, the second input of the second loop, and the second output of the second loop, an output of the first MapReduce job or the second MapReduce job being connected to the input of the other of the first MapReduce job or the second MapReduce job, wherein the generating of the distributed software package is further based on the directed input-output graph, and wherein the distributed software package further includes the second MapReduce job;

analyzing the non-distributed source code using a second compiler or interpreter for a programming language that the non-distributed source code is written in, the second compiler creating a code generator object for the non-distributed software program, wherein the identifying of the first loop within the non-distributed software program is based on the code generator object, the identifying of the first input, the first output, and the first grouping indicator is based on the code generator object, the identifying of the second loop is based on the code generator object, and the identifying of the second input of the second loop and the second output of the second loop is based on the code generator object; and determining a second mapper key for the second loop based on the directed input-output graph, the second MapReduce job occurring before the first MapReduce job in the directed input-output graph, the second mapper key being the same as the first mapper key, and wherein the second MapReduce job includes second mapper code using the second mapper key.

8. A computer for transcompiling a non-distributed source code for a non-distributed software program into a distributed software package for implementation on a distributed computing system, the computer comprising:
a processor; and
a non-transitory computer readable medium coupled to the processor, the computer readable medium comprising code that, when executed by the processor, cause the processor to:
identify a first loop within the non-distributed software program using the non-distributed source code;
determine a first grouping indicator associated with the first loop;
determine a first mapper key based on the first grouping indicator associated with the first loop;
generate a first MapReduce job based on the first mapper key and the non-distributed source code within the first loop, the first MapReduce job including a first mapper code and g first reducer code;
generate the distributed software package, the distributed software package including the first MapReduce job;
monitor an execution of the distributed software package;
generate a usage table based on the monitoring of the execution of the distributed software package;
identify one or more rules for regenerating the distributed software package using a machine learning searching algorithm;
move a set of code functionality from a reducer of the first MapReduce job into a mapper of the first MapReduce job based on the usage table and the one or more rules;
regenerate the first MapReduce job; and
regenerate the distributed software package using the regenerated first MapReduce job.

9. The computer of claim 8, wherein the computer readable medium further comprises code that, when executed by the processor, cause the processor to identify a first aggregation type of the first loop, the aggregation type being aggregative, and wherein the determining of the first mapper key is further based on the first aggregation type being aggregative.

10. The computer of claim 8, wherein the computer readable medium further comprises code that, when executed by the processor, cause the processor to:
identify a first input of the first loop and a first output of the first loop;
identify a second loop within the non-distributed software program using the non-distributed source code;
identify a second input of the second loop and a second output of the second loop;
generate a second MapReduce job using the non-distributed source code within the second loop; and
generate a directed input-output graph including the first MapReduce job and the second MapReduce job based on the first input of the first loop, the first output of the first loop, the second input of the second loop, and the second output of the fust second loop, an output of the first MapReduce job or the second MapReduce job being connected to the input of the other of the first MapReduce job or the second MapReduce job, wherein the generating of the distributed software package is further based on the directed input-output graph, and wherein the distributed software package further includes the second MapReduce job.

11. The computer of claim 10, wherein the computer readable medium further comprises code that, when executed by the processor, cause the processor to analyze the non-distributed source code using a second compiler or interpreter for a programming language that the non-distributed source code is written in, the second compiler creating a code generator object for the non-distributed software program,
wherein the identifying of the first loop within the non-distributed software program is based on the code generator object,
wherein the identifying of the first input, the first output, and the first grouping indicator is based on the code generator object,
wherein the identifying of the second loop is based on the code generator object, and
wherein the identifying of the second input of the second loop and the second output of the second loop is based on the code generator object.

12. The computer of claim 11, wherein the analyzing of the non-distributed source code using the second compiler determines a first aggregation type associated with the first loop using a configuration file for a function performed by the first loop, and wherein the second compiler determines the first grouping indicator.

13. The computer of claim 11, wherein the computer readable medium further comprises code that, when executed by the processor, cause the processor to determine a second mapper key for the second loop based on the directed input-output graph, the second MapReduce job occurring before the first MapReduce job in the directed input-output graph, the second mapper key being the same as the first mapper key, and wherein the second MapReduce job includes second mapper code using the second mapper key.

14. The computer of claim 8, wherein the computer readable medium further comprises code that, when executed by the processor, cause the processor to:
generate a usage statistics using on a log based on the execution of the distributed software package by the distributed computing system;
regenerate the first MapReduce job based on the usage statistics; and
regenerate the distributed software package using the regenerated the first MapReduce job.

* * * * *